(12) United States Patent
Vegvary

(10) Patent No.: US 7,503,195 B2
(45) Date of Patent: Mar. 17, 2009

(54) WHEEL LOCK APPARATUS

(76) Inventor: Alfred Michael Vegvary, Unit 2, 3, Scenic Crescent, South Perth (AU) 6151

( * ) Notice: Subject to any disclaimer, the term of this patent is extended or adjusted under 35 U.S.C. 154(b) by 151 days.

(21) Appl. No.: 10/487,832

(22) PCT Filed: Aug. 15, 2002

(86) PCT No.: PCT/AU02/01104

§ 371 (c)(1),
(2), (4) Date: Mar. 15, 2004

(87) PCT Pub. No.: WO03/018377

PCT Pub. Date: Mar. 6, 2003

(65) Prior Publication Data

US 2005/0076685 A1    Apr. 14, 2005

(30) Foreign Application Priority Data

Aug. 29, 2001 (AU) .................... PR7348
Jun. 12, 2002 (AU) .................... PS2904

(51) Int. Cl.
*B60R 25/00* (2006.01)
(52) U.S. Cl. .................. 70/226; 403/109.1; 280/304.1; 180/287; 188/2 F; 70/228
(58) Field of Classification Search ............... 70/14, 70/18, 19, 225, 226, 228; 280/402, 250.1, 280/250.2, 304.1; 188/32, 36, 1.12, 2 F, 188/2 R, 24.18, 68, 69, 72.1, 72.7, 72.9, 82.7, 188/19–23; 180/287; 403/109.1
See application file for complete search history.

(56) References Cited

U.S. PATENT DOCUMENTS

| | | | | |
|---|---|---|---|---|
| 565,537 A | * | 8/1896 | Gunderson .................. 70/228 |
| 565,658 A | * | 8/1896 | Akers .......................... 70/228 |
| 602,397 A | * | 4/1898 | Grass .......................... 70/228 |
| 675,676 A | * | 6/1901 | Russell ....................... 70/228 |
| 677,907 A | * | 7/1901 | Vandeleur ................... 70/233 |
| 2,685,351 A | | 8/1954 | Kramcsak, Jr. |
| 3,556,260 A | * | 1/1971 | Meyer et al. ................. 188/74 |
| 3,845,844 A | * | 11/1974 | Woerner ..................... 188/32 |
| 3,855,825 A | * | 12/1974 | Pickard ....................... 70/14 |
| 4,560,033 A | | 12/1985 | DeWoody et al. |
| 4,570,756 A | * | 2/1986 | Minnebraker et al. ....... 188/2 F |
| 4,603,875 A | * | 8/1986 | Boughton et al. ........... 280/272 |
| 4,691,933 A | * | 9/1987 | Strauss ..................... 280/304.1 |
| 4,749,064 A | * | 6/1988 | Jinno et al. ................. 188/2 F |

(Continued)

FOREIGN PATENT DOCUMENTS

AU    A-77283    12/1991

(Continued)

*Primary Examiner*—Suzanne D Barrett
(74) *Attorney, Agent, or Firm*—James Creighton Wray; Clifford D. Hyra

(57) ABSTRACT

A wheel lock apparatus for a wheeled vehicle, said vehicle having a tire, the wheel lock apparatus comprising at least one tooth, wherein the at least one tooth is moveable between a first position, against the tire, and a second position, remote therefrom, such that, in the first position, the at least one tooth is oriented to substantially prevent forward rotation of the tire by engaging the tire, whilst in the second position, the tire is free to rotate.

28 Claims, 6 Drawing Sheets

U.S. PATENT DOCUMENTS

| | | | | |
|---|---|---|---|---|
| 4,887,830 | A * | 12/1989 | Fought et al. | 280/304.1 |
| 4,987,978 | A * | 1/1991 | Jungersen | 188/2 F |
| 5,029,674 | A | 7/1991 | Boyes et al. | |
| 5,236,066 | A | 8/1993 | O'Neal et al. | |
| 5,355,977 | A * | 10/1994 | Kuschall | 188/2 F |
| 5,454,243 | A * | 10/1995 | Impastato | 70/228 |
| 5,490,582 | A * | 2/1996 | Trowbridge | 188/2 R |
| 6,102,166 | A | 8/2000 | Blodee | |
| 6,253,880 | B1 * | 7/2001 | Faber | 188/2 F |
| 6,520,526 | B2 * | 2/2003 | Amirola | 280/304.1 |
| 6,655,503 | B1 * | 12/2003 | Moody | 188/2 F |
| 7,252,300 | B2 * | 8/2007 | Hargroder | 280/304.1 |
| 2002/0153207 | A1 * | 10/2002 | Otaola et al. | 188/2 F |

FOREIGN PATENT DOCUMENTS

| | | |
|---|---|---|
| BE | 835195 | 1/1976 |
| EP | 424133 | 6/1994 |
| GB | 2140108 | 11/1984 |
| JP | 9/299941 | 11/1997 |
| JP | 2000/255429 | 9/2000 |

* cited by examiner

WHEEL LOCK APPARATUS

This application claims the benefit of Australian Provisional Patent Application No. PR 7348 filed Aug. 29, 2001, Australian Provisional Patent Application No. PS 2904 filed Jun. 12, 2003 and PCT/AU02/01104 filed Aug. 15, 2002.

FIELD OF THE INVENTION

The present invention relates to a wheel lock apparatus. The wheel lock apparatus of the present invention is particularly suited for deterring and/or preventing theft of wheeled vehicles, including trailers, such as boat trailers, caravans and the like.

BACKGROUND ART

Trailers, including those for boats, caravans and the like are particularly susceptible to theft, and instances of theft of trailers and caravans are occurring with increasing frequency. The security provisions commonly applied to cars are typically not suitable for trailers. For example, immobiliser type systems rely on interfering with the supply of power from the engine of a vehicle and, accordingly, have no utility in the protection of unpowered trailers from theft. Unpowered anti-theft devices, such as devices that interfere with the steering wheel of a motor vehicle, obviously have no application to trailers and the like.

Further, it is anticipated that a considerable portion of the market for anti-theft systems for trailers will be owners of existing trailers. Accordingly, the ease of installation of such devices to an existing trailer is of great importance.

The background to the present invention is discussed in the context of preventing/deterring theft of trailers. However, it should be understood that the application of the present invention extends to preventing/deterring theft of other wheeled vehicles, such as cars and motorcycles, as an alternative or complement to existing anti-theft systems.

The preceding discussion of the background to the invention is intended to facilitate an understanding of the present invention. However, it should be appreciated that the discussion is not an acknowledgement or admission that any of the material referred to was part of the common general knowledge in Australia as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

Throughout this specification, unless the context requires otherwise, the word "trailer" will be understood to include all devices designed or arranged to be towed by a motor vehicle or truck, including but not limited to boat trailers, bike trailers, car trailers, caravans and horse floats.

A tyre may be rotated in two directions, one corresponding to the forward motion of the trailer and one to the rearward motion of the trailer. For the purposes of concise description, the former will be referred to as forward rotation, and the latter as rearward rotation.

DISCLOSURE OF THE INVENTION

In accordance with the present invention there is provided a wheel lock apparatus for a wheeled vehicle, said vehicle having a tyre, the wheel lock apparatus comprising at least one tooth and a locking assembly, wherein the at least one tooth is moveable between a first position, against the tyre, and a second position, remote therefrom, such that, in the first position, the at least one tooth is oriented to substantially prevent forward rotation of the tyre by engaging the tyre, whilst in the second position, the tyre is free to rotate and wherein the at least one tooth is lockable in at least the first position by way of the locking assembly, thereby allowing the wheeled vehicle to be secured against unauthorized use.

Where the tyre comprises a tread portion interposed between two wall portions, the at least one tooth is moveable between a first position, against the tread portion of the tyre, and a second position, remote therefrom, such that, in the first position, the at least one tooth is oriented to substantially prevent forward rotation of the tyre by engaging the tread portion thereof.

Preferably, when in the first position, an edge of the at least one tooth contacts the tread of the tyre and a body of the or each tooth extends from the edge of the tooth in a direction between normal to the tread of the tyre and tangential to the tread of the tyre such that forward rotation of the tyre causes the tooth to engage the tread of the tyre.

In a preferred form of the invention, the wheel lock apparatus comprises at least one further tooth, wherein the at least one further tooth is moveable between a first position, against the tread portion of the tyre of the trailer, and a second position, remote therefrom, such that, in the first position, the at least one further tooth is oriented to substantially prevent rearward rotation of the tyre by engaging the tread portion thereof, whilst in the second position, the tyre is free to rotate.

Preferably, when in the first position, an edge of the at least one further tooth contacts the tread of the tyre and a body of the or each further tooth extends from the edge of the further tooth in a direction between normal to the tread of the tyre and tangential to the tread of the tyre such that rearward rotation of the tyre causes the further tooth to engage the tread of the tyre.

Preferably, the or each tooth and the or each further tooth are provided on a single plate, wherein the plate is moveable between a first position, wherein the or each tooth and the or each further tooth are positioned against the tread portion of the tyre of the trailer, and a second position, remote therefrom.

In a specific form of the invention, the wheel lock apparatus further comprises an arm member, having a first end and a second end, wherein the first end of the arm member is pivotally attached to the trailer, and the or each tooth, and the or each further tooth where provided, is provided about the second end of the arm member, wherein the arm member may be pivoted between a first position, where the or each tooth is against the tread portion of the tyre, and a second position, where the or each tooth is remote therefrom.

Preferably, where the or each tooth, and the or each further tooth, where provided, are mounted on a plate, the plate is preferably pivotally attached to the second end of the arm member.

The tooth and further tooth may be provided integrally with the plate.

In a specific form of the invention, the wheel lock apparatus comprises one tooth, and one further tooth, the tooth and further tooth being provided integrally with the plate in the form of a concave member.

Preferably, the wheel lock assembly further comprises a mounting plate, wherein the mounting plate is attached to the bodywork of the vehicle proximate the tyre thereof, such that the mounting plate faces the tread portion of the tyre, the mounting plate having an inner face proximate the tyre and an outer face remote therefrom, defining an interior, proximate the tyre, and an exterior remote therefrom.

Where the vehicle is provided with a wheel arch, the mounting plate may be provided in the form of a portion of the wheel arch.

Preferably, the first end of the arm member is pivotally attached to the inner face of the mounting plate.

In one form of the invention, the wheel lock apparatus further comprises an actuator assembly, wherein the actuator assembly is adapted to act on the arm member such that operation of the actuator assembly causes the arm member to be moved between the first position and the second position.

In a preferred form of the invention, the wheel lock apparatus further comprises a biasing assembly such that, when the or each tooth is not locked in the first position, the or each tooth is biased toward the second position. Preferably still, where the wheel lock apparatus comprises one or more further teeth, and the or each further tooth is not locked in the first position, the or each further tooth is biased toward the second position.

In one form of the invention, an aperture is provided through the mounting plate and the actuator assembly comprises a plunger, having a first end and a second end, and extending through the aperture in the mounting plate such that the first end of the plunger is located in the interior and pivotally engages the arm member at a point intermediate the first and second ends thereof, and the second end is located exterior to the mounting plate.

Where the actuator assembly is provided in the form of a plunger, the arm member may be formed from a flexibly resilient material such that, in use, pressure on the plunger causes deformation of the arm member, in turn providing pressure to maintain the contact of the or each tooth with the tyre tread.

Where the actuator assembly comprises a plunger, the locking assembly may be provided in the form of one or more indentations or apertures provided along the length of the plunger, and a pin member slidably mounted to the trailer, wherein the or each aperture or indentation is adapted to at least partially receive the pin member, the sliding movement of the pin member being governed by a lock.

Where the actuator assembly comprises a plunger, the biasing assembly may be provided in the form of a spring, wherein the spring is provided about the portion of the plunger exterior to the mounting plate, between the outer face of the mounting plate and a flared second end of the plunger.

In a second form of the invention, the actuator assembly comprises a cam and lever assembly, having a lever portion operatively interconnected with a cam portion, wherein the cam and lever assembly is adapted to pivot between a first position where the cam portion acts on the arm member and causes such to assume the first position, and a second position, where the cam portion allows the arm member to assume the second position.

Preferably, the cam assembly is pivotally attached to the mounting plate, with an aperture being provided through the mounting plate such that, when the cam and lever assembly is in the first position, the cam portion extends through the aperture to act on the arm member.

Preferably, the cam portion acts on the arm member at a point intermediate the first and second ends thereof.

The cam portion and the lever portion of the cam and lever assembly may be provided integrally.

In a specific form of the invention, the locking assembly is provided in the form of first and second projections provided from the mounting plate, each having an aperture provided therethrough, and an aperture is provided through the cam and lever assembly such that, when the cam and lever assembly is in the first position, the aperture of the cam and lever assembly is substantially aligned with the aperture through the first projection and, when the cam and lever assembly is in the second position, the aperture of the cam and lever assembly is aligned with the second projection, whereby the cam and lever assembly may be conveniently locked in either the first or second positions.

BRIEF DESCRIPTION OF THE DRAWINGS

The wheel lock apparatus of the present invention will now be described, by way of example only, with reference to two embodiments thereof and the accompanying drawings, in which:—

BEST MODE(S) FOR CARRYING OUT THE INVENTION

Figure 1:
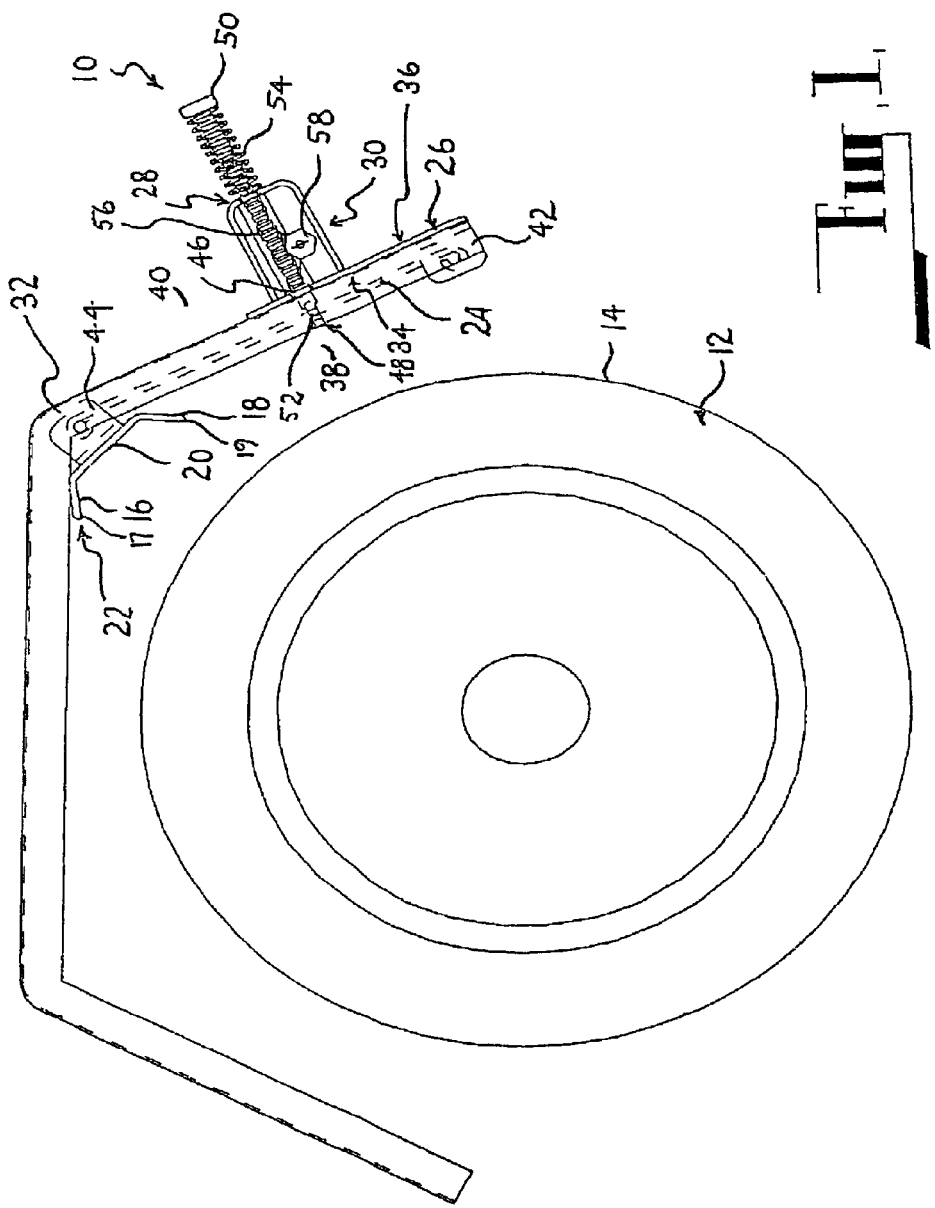
FIG. 1 is a side elevation showing a portion of a trailer comprising a wheel arch and a wheel, the trailer being fitted with a wheel lock device according to the first embodiment, the wheel lock device being in a disengaged state.
Figure 2:
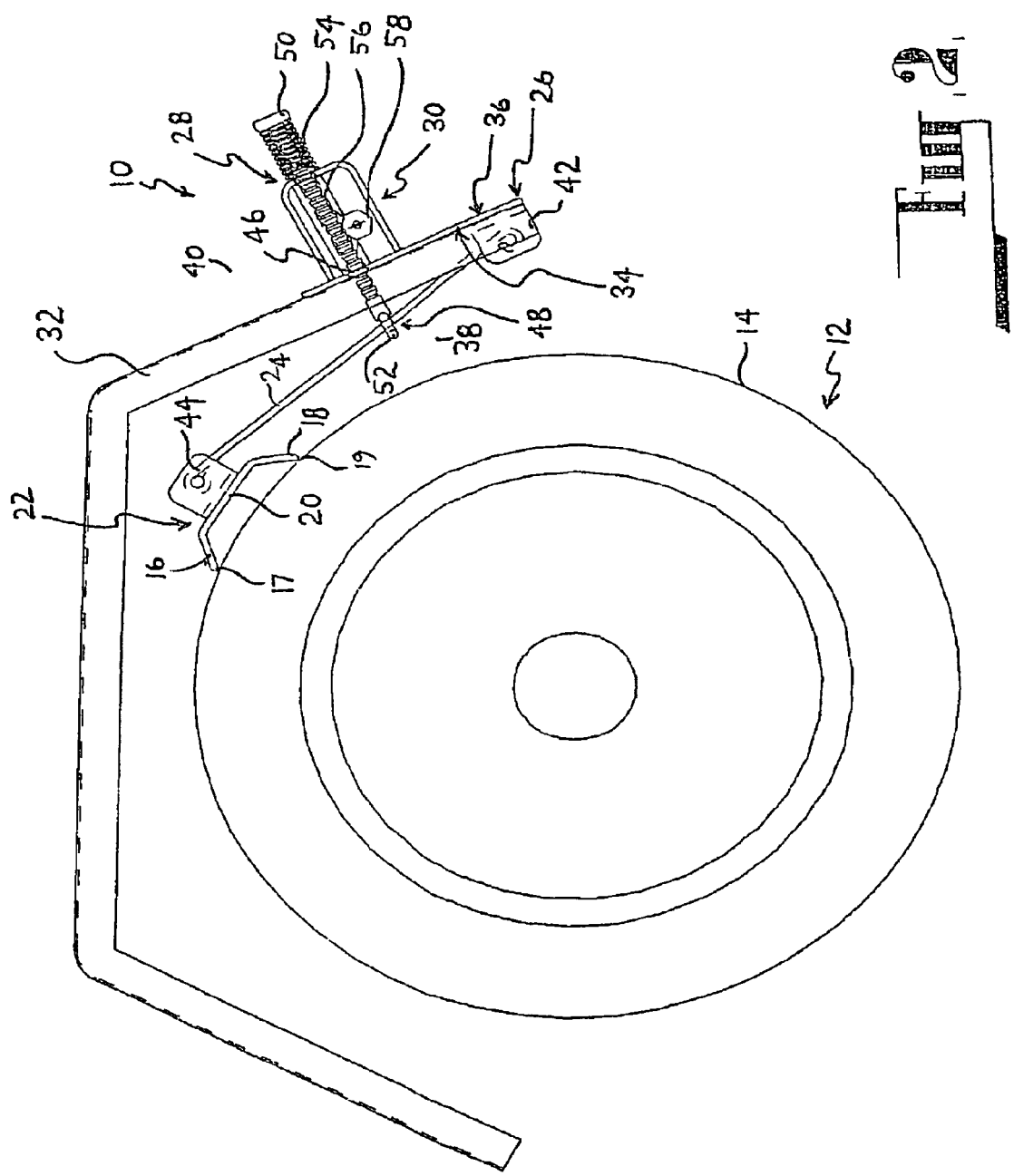
FIG. 2 is a side elevation showing a portion of a trailer and wheel lock apparatus of FIG. 1, the wheel lock apparatus being in an engaged state.
Figure 3:
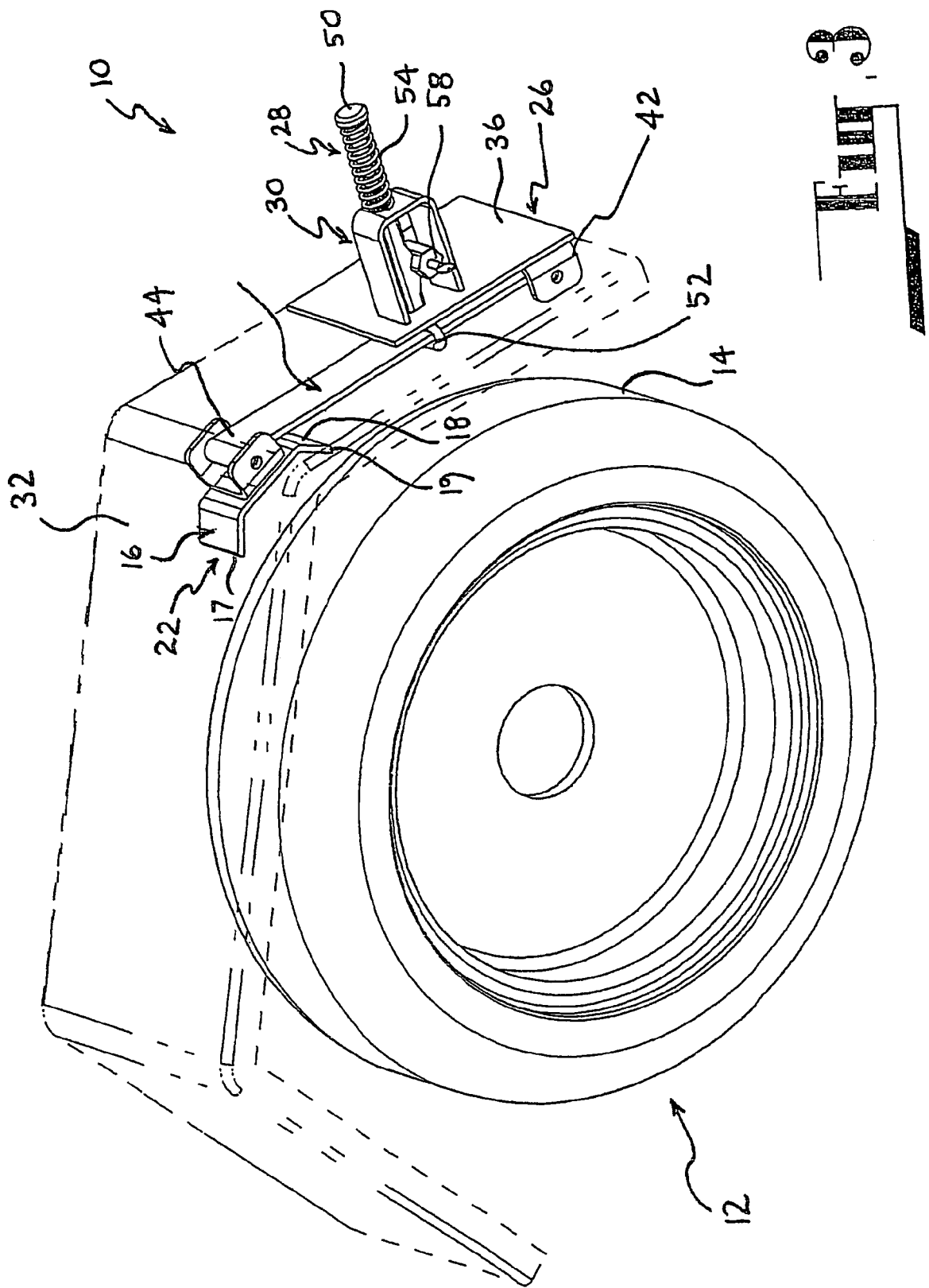
FIG. 3 is a perspective view of the portion of the trailer and wheel lock apparatus of FIGS. 1 and 2.

In FIGS. 1 to 3 there is shown a wheel lock apparatus 10, for a trailer (not shown) having a tyre 12 with a tread portion 14. The wheel lock apparatus comprises a first tooth having a body 16 and an edge 17, a second tooth having a body 18 and an edge 19, and a plate 20, integrally provided in the form of a concave member 22.

The wheel lock assembly 10, further comprises an arm member 24, a mounting plate 26, an actuator assembly in the form of a plunger 28, and a locking assembly 30.

The mounting plate 26 is attached to a portion of a wheel arch 32, thereby reinforcing such, facing the tread portion 14 of the tyre 12. The mounting plate 26 includes an inner face 34, proximate the tyre 12, and an outer face 36, remote therefrom, thereby defining an interior 38, proximate the tyre, and an exterior 40, remote therefrom.

A first end 42 of the arm member 24 is pivotally attached to the inner face 34 of the mounting plate 26, whilst a second end 44 of the arm member being pivotably attached to the concave member 22.

An aperture 46 is provided through the mounting plate 26, with the plunger 28 being provided through the aperture 46, such that a first end 48 of the plunger 28 pivotally engages to the arm member 24 at a point intermediate the first and second ends 42 and 44 thereof, whilst a second, flared end 50 of the plunger 28 is located in the exterior 40.

As can best be seen in FIG. 3, the first end 48 of the plunger 28 comprises a loop 52, through which the arm member 24 is slidably and pivotably received. A biasing assembly in the form of a coil spring 54 is provided about the plunger 28, between the flared second end 50 thereof and the outer face 36 of the mounting plate 26.

The locking assembly 30 comprises a series of indentations 56 along the length of the plunger 28, wherein each indentation is adapted to at least partially receive a pin member (not shown), the slidable movement of which is governed by a lock 58.

Accordingly, depression of the plunger 28, against the bias of the coil spring 54, causes the arm member 24, and accordingly the concave member 22, to move from a second position proximate the wheel arch 32, as can best be seen in FIG. 1, to a first position where the edges 17 and 19 of the first and second teeth of the concave member 22, are against the tread portion 14 of the tyre 12, as can best be seen in FIG. 2.

When the arm member 24 is in the first position, and the edges 17 and 19 of the first and second teeth are against the tread portion 14 of the tyre 12, body 16 of the first tooth is oriented such that minor forward rotation of the tyre 12 causes the edge 17 of the first tooth to engage the tread portion 14 thereof and thereby prevent further rotation, whilst the body 18 of the second tooth is oriented such that minor rearward rotation of the tyre 12 causes the edge 19 of the second tooth to engage the tread portion 14 of the tyre, thereby preventing rearward rotation thereof.

When a user (not shown) wishes to use the trailer, the user ensures the lock 58 is disengaged, such that the spring 54 causes the arm member 24 to assume the second position, wherein the edges 17 and 19 of the first and second teeth are remote from the tread portion 14 of the tyre 12. For safety, the arm member 24 may be locked in this position by way of the locking assembly 30. The trailer may then be used in the normal manner.

When the user wishes to secure the trailer, the user depresses the plunger 28, against the bias of the spring 54, such that the arm member 24 moves to the first position, wherein the edges 17 and 19 of the first and second teeth are against the tread portion 14 of the tyre. Application of pressure on the plunger 28 applies pressure to the arm member 24, at a point intermediate the first and second ends 42 and 44 thereof, causing such to deform slightly, the flexibly resilient material from which the arm member 24 is formed thereby maintaining contact between the edges 17 and 19 of the first and second teeth with the tread portion of the tyre. The plunger 28, and thus the arm member 24 and concave member 22 may be locked in this position by way of the lock 58 of the locking assembly 30, thereby preventing unauthorized rotation of the tyre 12 of the trailer, by way of the engagement of the edges 17 and 19 of the first and second teeth with the tread portion 14 of the tyre 12, and thereby unauthorized movement of the trailer.

Figure 4:
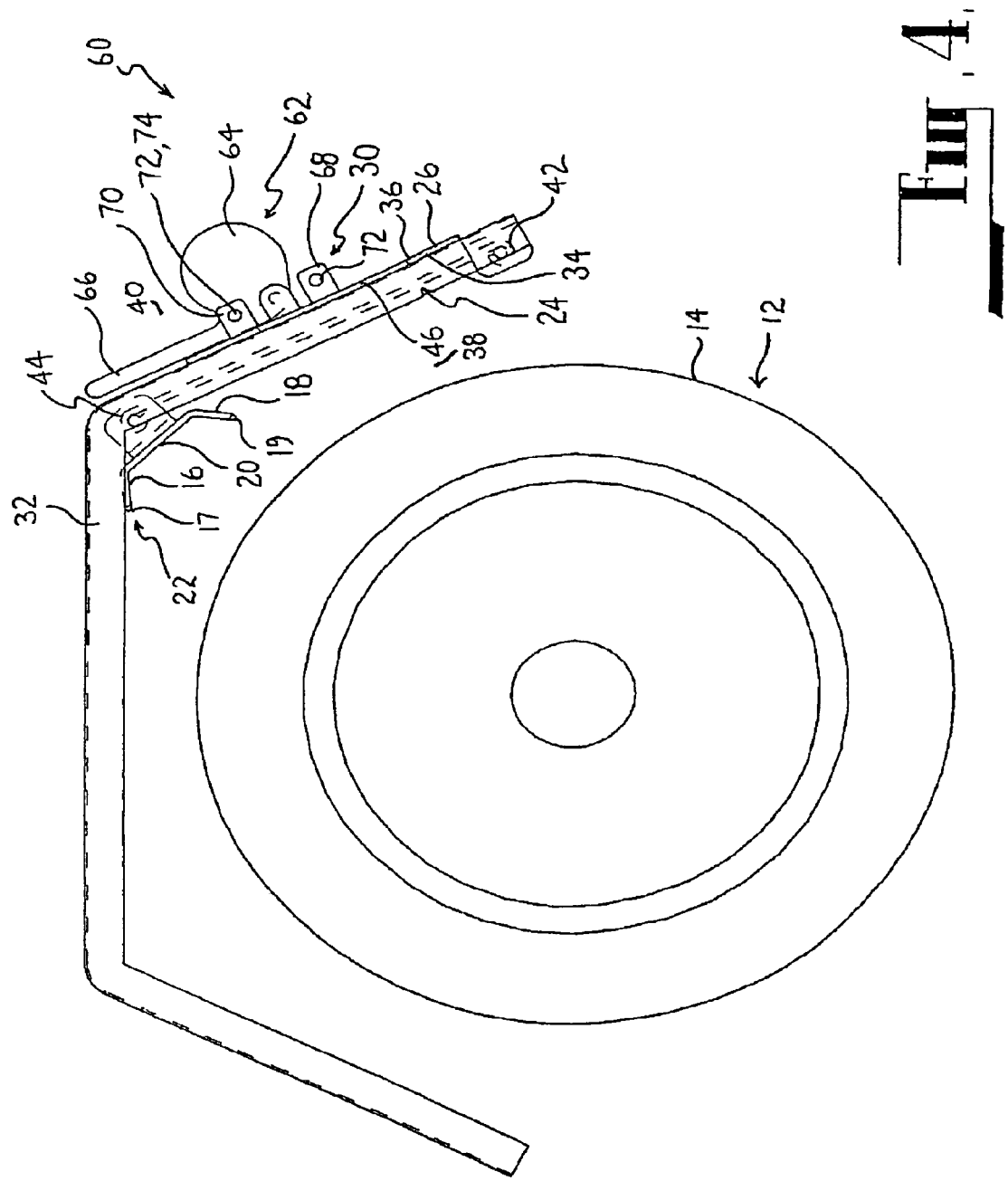
FIG. 4 is a side elevation showing a portion of a trailer comprising a wheel arch and a wheel, the trailer being fitted with a wheel lock device according to a second embodiment, the wheel lock device being in a disengaged state.
Figure 5:
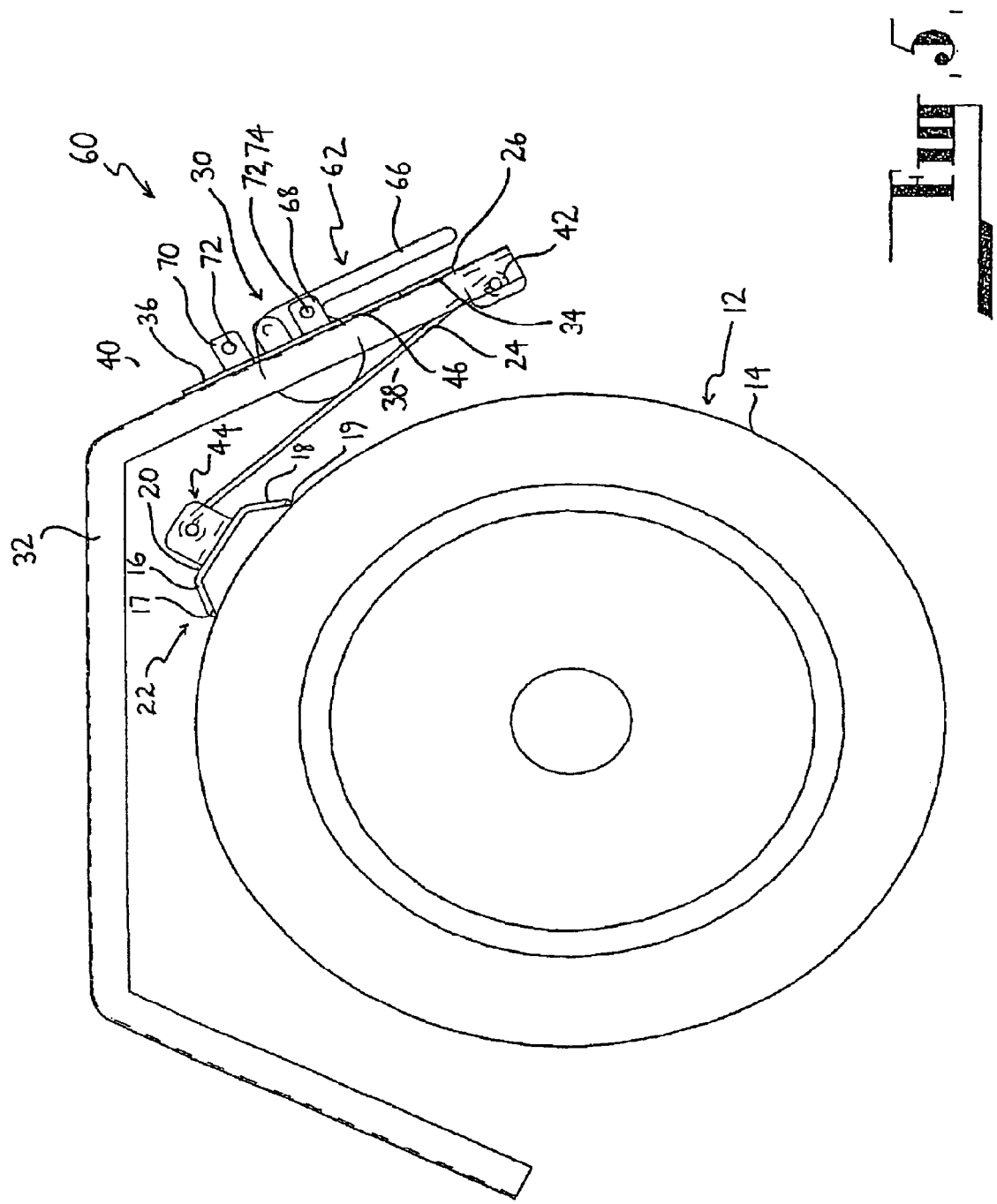
FIG. 5 is a side elevation showing a portion of a trailer and wheel lock apparatus of FIG. 4, the wheel lock apparatus being in an engaged state.
Figure 6:
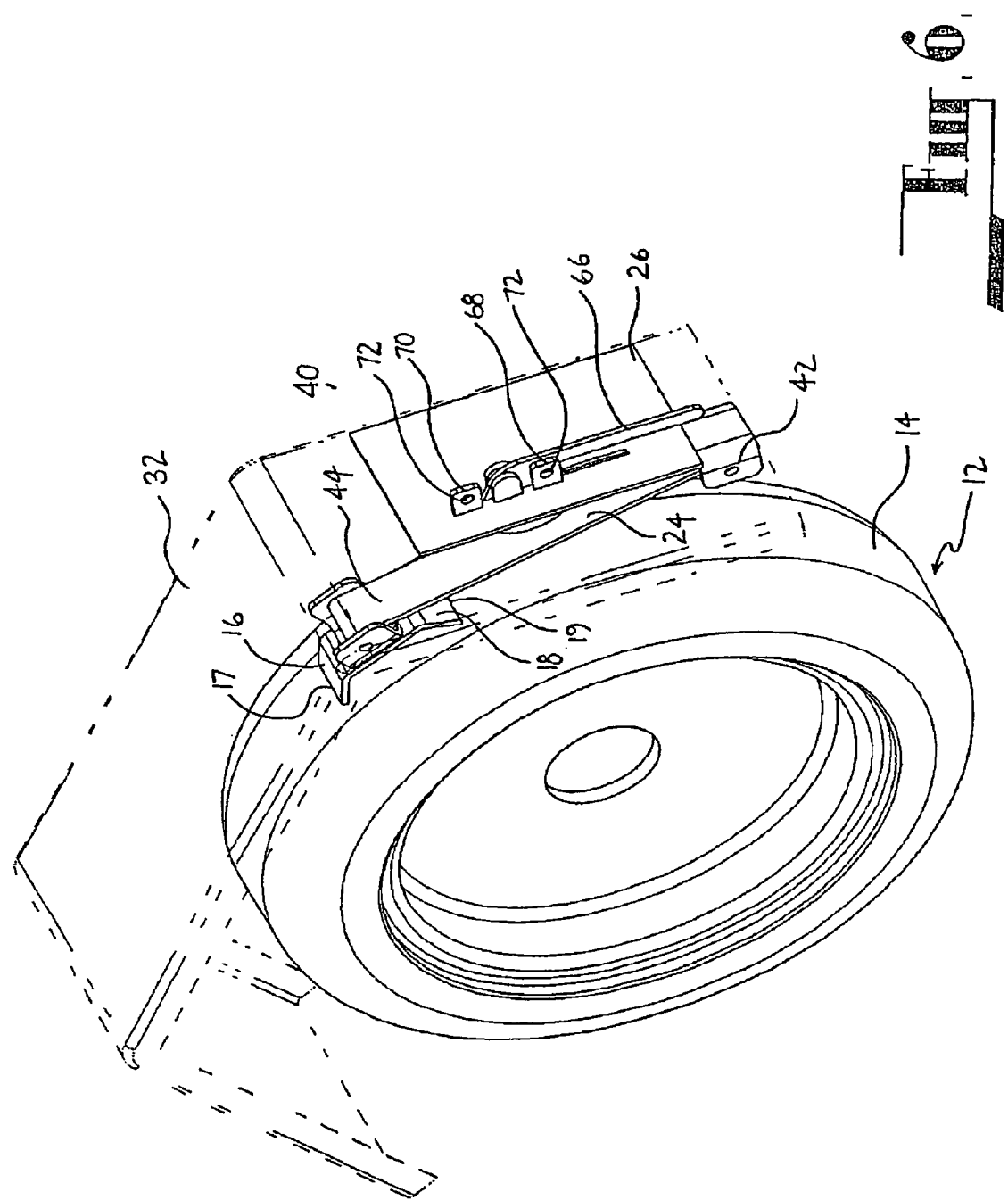
FIG. 6 is a perspective view of the portion of the trailer and wheel lock apparatus of FIGS. 4 and 5.

In FIGS. 4 to 6 there is shown a wheel lock apparatus 60, for a trailer (not shown). The wheel lock apparatus 60 is substantially similar to the wheel lock apparatus 10, and like numerals will be used to denote like parts. However, unlike the wheel lock apparatus 10, the actuator assembly is not provided in the form of a plunger 28, and the locking assembly 30 takes a different form.

Rather, the actuator assembly is provided in the form of a cam and lever assembly 62. The cam and lever assembly 62 comprises a cam portion 64 integrally formed with a lever portion 66. The cam and lever assembly 62 is pivotally attached to the mounting plate 26, and is adapted to pivot between a first position, where the cam portion 64 extends through the aperture 46 of the mounting plate 26 to act on the arm member 24, and a second position, where the cam portion 64 is remote from the arm member 24. A biasing means (not shown), provided about the first end 42 of the arm member 24 biases the arm member 24 to the second position.

The locking assembly 30 is provided in the form of first and second projections 68 and 70 provided from the mounting plate 26, each having an aperture 72 provided therethrough. The locking assembly 30 further comprises an aperture 74 provided through the cam and lever assembly 62. The projections 68 and 70 and apertures 72 and 74 are aligned such that, when the cam and lever assembly 62 is in the first position, the aperture 74 is substantially aligned with the aperture 72 through the first projection 68. When the cam and lever assembly 62 is in the second position, the aperture 74 of the cam and lever assembly 62 is aligned with the aperture 72 of the second projection 70.

In use, the wheel lock apparatus 60 is similar to the wheel lock apparatus 10. When a user (not shown) wishes to use the trailer, the user ensures the cam and lever assembly 62 is locked in the second position. This can be achieved by placing a padlock or similar (not shown) simultaneously through the aperture 72 in the second projection 70 and the aperture 74 provided through the cam and lever assembly 62.

When the user wishes to secure the trailer the user, by way of the lever portion 66, rotates the cam and lever assembly 62 such that the cam portion 64 acts on the arm member 24, moving such into the first position, wherein the edges 17 and 19 of the first and second teeth are against the tread portion 14 of the tyre. Application of pressure on the lever portion 66 applies pressure to the arm member 24, at a point intermediate the first and second ends 42 and 44 thereof, causing such to deform slightly, the flexibly resilient material from which the arm member 24 is formed thereby maintaining contact between the edges 17 and 19 of the first and second teeth with the tread portion of the tyre. The cam and lever assembly 62, and thus the arm member 24 and concave member 22 may be locked in this position by placing a padlock or similar (not shown) simultaneously through the aperture 72 in the first projection 68 and the aperture 74 provided through the cam and lever assembly 62.

Modifications and variation such as would be apparent to the skilled addressee are considered to fall within the scope of the present invention.

The invention claimed is:

1. A trailer wheel lock apparatus for a wheeled trailer vehicle, said trailer vehicle having a trailer tire, the trailer wheel lock apparatus comprising at least one tooth and a lock opened by a key, wherein the trailer wheel lock apparatus is supported by the body of the trailer vehicle, wherein the at least one tooth is moveable between a first position, against the trailer tire, and a second position, remote therefrom, such that, in the first position, the at least one tooth is oriented to substantially prevent forward rotation of the tire by engaging the trailer tire, whilst in the second position, the trailer tire is free to rotate and wherein the at least one tooth is keyably lockable in at least the first position by way of the lock, thereby allowing the wheeled vehicle to be secured against unauthorised use.

2. A trailer wheel lock apparatus according to claim 1, where the trailer tire comprises a tread portion interposed between two wall portions, wherein the at least one tooth is moveable between a first position, against the tread portion of the trailer tire, and a second position, remote therefrom, such that, in the first position, the at least one tooth is oriented to substantially prevent forward rotation of the trailer tire by engaging the tread portion thereof.

3. A trailer wheel lock apparatus according to claim 1, wherein when in the first position, an edge of the at least one tooth contacts the tread of the trailer tire and a body of the at least one tooth always extends from the edge of the tooth in a direction between normal to the tread of the trailer tire and tangential to the tread of the trailer tire such that forward rotation of the trailer tire causes the tooth to engage the tread of the trailer tire.

4. A trailer wheel lock apparatus according to claim 1, wherein the wheel lock apparatus comprises at least one further tooth, wherein the at least one further tooth is moveable between a first position, against the tread portion of the tire of the trailer, and a second position, remote therefrom, such that, in the first position, the at least one further tooth is oriented to substantially prevent rearward rotation of the trailer tire by engaging the tread portion thereof, whilst in the second position, the trailer tire is free to rotate.

5. A trailer wheel lock apparatus according to claim 4, wherein, when in the first position, an edge of the at least one further tooth contacts the tread of the trailer tire and a body of the or each further tooth always extends from the edge of the further tooth in a direction between normal to the tread of the trailer tire and tangential to the tread of the trailer tire such that rearward rotation of the trailer tire causes the further tooth to engage the tread of the trailer tire.

6. A trailer wheel lock apparatus according to claim 4, wherein the at least one tooth and the at least one further tooth are provided on a plate, wherein the plate is moveable between a first position, wherein the at least one tooth and the at least one further tooth are always positioned against the tread portion of the trailer tire, and a second position, remote therefrom.

7. A trailer wheel lock apparatus according to claim 6, wherein the or each tooth and the or each further tooth, are provided integrally with the plate.

8. A trailer wheel lock apparatus according to claim 1, wherein the trailer wheel lock apparatus comprises an arm member, having a first end and a second end, wherein the first end of the arm member is pivotally attached to the trailer, and the or each tooth is provided on a plate about the second end of the arm member, wherein the arm member may be pivoted between a first position, where the or each tooth is against the tread portion of the trailer tire, and a second position, where the or each tooth is remote therefrom.

9. A trailer wheel lock apparatus according to claim 8, wherein the trailer wheel lock apparatus comprises an actuator assembly, wherein the actuator assembly is adapted to act on the arm member such that operation of the actuator assembly causes the arm member to be moved between the first position and the second position.

10. A wheel lock apparatus according to claim 9, wherein the actuator assembly comprises a plunger, having a first end and a second end, such that the first end of the plunger pivotally engages the arm member at a point intermediate the first and second ends thereof, and the second end is located exterior to the mounting plate.

11. A wheel lock apparatus according to claim 10, wherein an aperture is provided through the mounting plate, the plunger extending through the aperture.

12. A wheel lock apparatus according to claim 10, wherein the locking assembly is provided in the form of one or more indentations or apertures provided along the length of the plunger, and a pin member slidably mounted to the trailer, wherein the or each aperture or indentation is adapted to at least partially receive the pin member, the sliding movement of the pin member being governed by a lock.

13. A wheel lock assembly according to claim 10, wherein the biasing assembly is provided in the form of a spring, wherein the spring is provided about the portion of the plunger exterior to the mounting plate, between the outer face of the mounting plate and a flared second end of the plunger.

14. A wheel lock apparatus according to claim 10, wherein, where the actuator assembly is provided in the form of a plunger, the arm member is formed from a flexibly resilient material such that, in use, pressure on the plunger causes deformation of the arm member, in turn providing pressure to maintain the contact of the or each tooth with the tire tread.

15. A trailer wheel lock apparatus according to claim 1, wherein the actuator assembly comprises a cam and lever assembly, having a lever portion operatively interconnected with a cam portion, wherein the cam and lever assembly is adapted to pivot between a first position where the cam portion acts on the arm member and causes such to assume the first position, and a second position, where the cam portion allows the arm member to assume the second position.

16. A trailer wheel lock apparatus according to chum 15, further comprising a mounting plate, wherein the mounting plate is attached to the bodywork of the trailer vehicle proximate the tire thereof, wherein the cam assembly is pivotally attached to the mounting plate, with an aperture being provided through the mounting plate such that, when the cam and lever assembly is in the first position, the cam portion extends through the aperture to act on the arm member.

17. A wheel lock apparatus according to claim 15, wherein the cam portion and the lever portion of the cam and lever assembly are provided integrally.

18. A trailer wheel lock apparatus according to claim 15, wherein the cam and lever assembly comprises a handle attached to a disk-shaped member, wherein pulling the handle rotates the disk-shaped member about a pivot point and forces it against the arm member, pushing the arm member into the first position.

19. A trailer wheel lock apparatus according to claim 15, wherein the lever portion is locked in place by a locking mechanism of the keyed locking assembly.

20. A trailer wheel lock apparatus for a wheeled trailer vehicle, said trailer vehicle having a trailer tire, the trailer wheel lock apparatus comprising at least one tooth and a lock opened by a key, wherein the at least one tooth is moveable between a first position, against the trailer tire, and a second position, remote therefrom, such that, in the first position, the at least one tooth is oriented to substantially prevent forward rotation of the tire by engaging the trailer tire, whilst in the second position, the trailer tire is free to rotate and wherein the at least one tooth is keyably lockable in at least the first position by way of the lock, thereby allowing the wheeled vehicle to be secured against unauthorised use, wherein the trailer wheel lock apparatus comprises an arm member, having a first end and a second end, wherein the first end of the arm member is pivotally attached to the trailer, and the or each tooth is provided on a plate about the second end of the arm member, wherein the arm member may be pivoted between a first position, where the or each tooth is against the tread portion of the trailer tire, and a second position, where the or each tooth is remote therefrom, wherein the plate is pivotally attached to the second end of the arm member.

21. A trailer wheel lock apparatus according to claim 20, wherein the trailer wheel lock apparatus comprises one tooth, and one further tooth, the tooth and further tooth being provided integrally with the plate in the form of a concave member.

22. A trailer wheel lock apparatus according to claim 20, wherein the trailer wheel lock assembly comprises a mounting plate, wherein the mounting plate is attached to the bodywork of the trailer vehicle proximate the tire thereof, such that the mounting plate faces the tread portion of the trailer tire, the mounting plate having an inner face proximate the trailer tire and an outer face remote therefrom, defining an interior, proximate the trailer tire, and an exterior remote therefrom.

23. A trailer wheel lock apparatus according to claim 22 wherein the first end of the arm member is pivotally attached to the inner face of the mounting plate.

24. A trailer wheel lock apparatus according to claim 20 wherein the trailer wheel lock apparatus comprises a biasing assembly such that, when the or each tooth is not locked in the first position, the or each tooth is biased toward the second position.

25. A trailer wheel lock apparatus according to claim 20, wherein the actuator assembly comprises a cam and lever assembly, having a lever portion operatively interconnected with a cam portion, wherein the cam and lever assembly is adapted to pivot between a first position where the cam portion acts on the arm member and causes such to assume the first position, and a second position, where the cam portion allows the arm member to assume the second position, wherein the cam portion acts on the arm member at a point intermediate the first and second ends thereof.

26. A trailer wheel lock apparatus according to claim 20, wherein the actuator assembly comprises a cam and lever assembly, having a lever portion operatively interconnected with a cam portion, wherein the cam and lever assembly is adapted to pivot between a first position where the cam portion acts on the arm member and causes such to assume the first position, and a second position, where the cam portion allows the arm member to assume the second position, wherein, the arm member is formed from a flexibly resilient material such that, in use, the cam portion causes deformation of the arm member, in turn providing pressure to maintain the contact of the or each tooth with the tire tread.

27. A wheel lock apparatus for a wheeled vehicle, said vehicle having a tire, the wheel lock apparatus comprising at least one tooth and a locking assembly, wherein the at least one tooth is moveable between a first position, against the tire, and a second position, remote therefrom, such that, in the first position, the at least one tooth is oriented to substantially prevent forward rotation of the tire by engaging the tire, whilst in the second position, the tire is free to rotate and wherein the at least one tooth is lockable in at least the first position by way of the locking assembly, thereby allowing the wheeled vehicle to be secured against unauthorised use, wherein the actuator assembly comprises a cam and lever assembly, having a lever portion operatively interconnected with a cam portion, wherein the cam and lever assembly is adapted to pivot between a first position where the cam portion acts on the arm member and causes such to assume the first position, and a second position, where the cam portion allows the arm member to assume the second position, wherein the locking assembly is provided in the form of first and second projections provided from the mounting plate, each having an aperture provided therethrough, and an aperture is provided through the cam and lever assembly such that, when the cam and lever assembly is in the first position, the aperture of the cam and lever assembly is substantially aligned with the aperture through the first projection and, when the cam and lever assembly is in the second position, the aperture of the cam and lever assembly is aligned with the second projection, whereby the cam and Lever assembly may be conveniently locked in either the first or second positions.

28. A wheel lock apparatus for a wheeled vehicle, said vehicle having a tire, the wheel lock apparatus comprising at least one tooth and a locking assembly, wherein the at least one tooth is moveable between a first position, against the tire, and a second position, remote therefrom, such that, in the first position, the at least one tooth is oriented to substantially prevent forward rotation of the tire by engaging the tire, whilst in the second position, the tire is free to rotate and wherein the at least one tooth is lockable in at least the first position by way of the locking assembly, thereby allowing the wheeled vehicle to be secured against unauthorised use, wherein the wheel lock assembly comprises a mounting plate, wherein the mounting plate is attached to the bodywork of the vehicle proximate the tire thereof, such that the mounting plate faces the tread portion of the tire, the mounting plate having an inner face proximate the tire and an outer face remote therefrom, defining an interior, proximate the tire, and an exterior remote therefrom, and wherein, where the vehicle is provided with a wheel arch, the mounting plate may be provided in the form of a portion of the wheel arch.

* * * * *